US007753069B2

(12) United States Patent
Nichols et al.

(10) Patent No.: US 7,753,069 B2
(45) Date of Patent: Jul. 13, 2010

(54) DRAIN VALVE

(75) Inventors: Randall W. Nichols, Westlake, OH (US); Fred W. Hoffman, Columbia Station, OH (US); Leonard A. Quinn, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 80 days.

(21) Appl. No.: 10/926,251

(22) Filed: Aug. 25, 2004

(65) Prior Publication Data

US 2006/0162778 A1    Jul. 27, 2006

Related U.S. Application Data

(60) Provisional application No. 60/481,288, filed on Aug. 25, 2003.

(51) Int. Cl.
    *F16T 1/14* (2006.01)
(52) U.S. Cl. .................................. 137/204; 96/408
(58) Field of Classification Search ............ 137/1, 137/12, 187, 192, 204, 590, 504; 210/304; 95/105, 122; 422/173; 96/408; 55/915, 55/415
    See application file for complete search history.

(56) References Cited

U.S. PATENT DOCUMENTS

| 734,621 | A | * | 7/1903 | Southerland | 137/371 |
|---|---|---|---|---|---|
| 840,583 | A | * | 1/1907 | Pickels | 137/192 |
| 1,822,006 | A | * | 9/1931 | Bull | 210/304 |
| 2,058,189 | A | * | 10/1936 | Stuard | 137/204 |
| 2,541,282 | A | * | 2/1951 | Powers | 137/204 |
| 2,619,106 | A | * | 11/1952 | Wilkerson | 137/204 |
| 2,629,458 | A | * | 2/1953 | Allen et al. | 96/409 |
| 2,707,000 | A | | 4/1955 | Peeps | |
| 2,726,732 | A | * | 12/1955 | Wilson, Jr. et al. | 96/409 |
| 2,739,605 | A | * | 3/1956 | Smith | 137/204 |
| 3,013,628 | A | * | 12/1961 | Jacobs et al. | 422/173 |
| 3,330,292 | A | | 7/1967 | Lanksy | |
| 3,675,673 | A | | 7/1972 | Nilges | |
| 3,698,555 | A | * | 10/1972 | Conner | 210/138 |
| 3,802,570 | A | * | 4/1974 | Dehne | 210/304 |
| 3,817,267 | A | * | 6/1974 | Hicks et al. | 137/204 |
| 3,827,562 | A | * | 8/1974 | Esmond | 210/304 |
| 3,922,151 | A | * | 11/1975 | Kiss et al. | 95/220 |
| 4,038,051 | A | * | 7/1977 | Ide | 96/408 |
| 4,097,248 | A | | 6/1978 | Frantz | |

(Continued)

OTHER PUBLICATIONS

Chemical Engineers' Handbook, Fourth Edition, Edited by R. H. Perry, C. H. Chilton, S. D. Kirkpatrick, McGraw-Hill, New York (1963), cover page and pp. 20-67 through 20-69.

*Primary Examiner*—John Rivell
*Assistant Examiner*—Craig Price
(74) *Attorney, Agent, or Firm*—Calfee, Halter & Griswold LLP

(57) ABSTRACT

A drain valve for a vehicle compressed air system, which separates dirt, water, debris and other relatively heavy objects from a compressed air stream. The drain valve includes a sump with a tangential inlet. The tangential inlet creates a vortex within the sump that collects relatively heavy objects at the bottom of the sump and allows the compressed air to exit the drain valve through an outlet port located at the top of the drain valve. A pressure actuated valve and drain port allows for the water to be discharged from the drain valve while retaining the pneumatic signal.

8 Claims, 5 Drawing Sheets

U.S. PATENT DOCUMENTS

| | | | |
|---|---|---|---|
| 4,212,653 A * | 7/1980 | Giles | 95/271 |
| 4,271,019 A * | 6/1981 | Galletti | 210/108 |
| 4,313,910 A * | 2/1982 | Dries et al. | 422/147 |
| 4,455,220 A * | 6/1984 | Parker et al. | 208/161 |
| 4,731,228 A * | 3/1988 | Dewitz et al. | 422/144 |
| 4,810,264 A * | 3/1989 | Dewitz | 48/210 |
| 4,908,049 A * | 3/1990 | Yoshida et al. | 96/248 |
| 5,287,916 A | 2/1994 | Miller | |
| 5,762,094 A | 6/1998 | Hendershot et al. | |
| 5,766,314 A * | 6/1998 | Weber et al. | 95/220 |
| 7,166,230 B2 * | 1/2007 | Nilsen et al. | 210/739 |
| 2004/0040273 A1 * | 3/2004 | Lewin | 55/447 |

\* cited by examiner

DRAIN VALVE

CROSS-REFERENCE TO RELATED APPLICATIONS

This application claims the benefit under 35 U.S.C. §119 (e) of U.S. Provisional Application Ser. No. 60/481,288 filed Aug. 25, 2003, the entire disclosure of which is hereby incorporated by reference.

BACKGROUND

Tractor-trailer trucks are designed to be connected and disconnected. The trailer air brakes are powered and controlled from the tractor through two pneumatic lines—one line supplies air at full system pressure to power the trailer brakes, and the other supplies a pneumatic control signal of varying pressure to indicate when the brakes should be applied or released. The standard connection for these lines between the tractor and trailer is called a gladhand. When the trailer is disconnected from the tractor, the gladhands are generally exposed to the environment, and thus allow water, debris and insects into the system. Water and debris in the system can impact the brake control valves and may even cause them to malfunction.

Prior solutions to this problem include U.S. Pat. No. 6,358,291 directed to a dual desiccant bed device for capturing incidental water entering the system and subsequently releasing it slowly into dried air from the tractor. U.S. Pat. No. 5,762,094 is directed to a drain mechanism incorporated into the brake relay valve, however, such a mechanism is generally incompatible with anti-lock brake systems. As such, there exists a need to provide a mechanism for capturing and venting any water that is introduced into the trailer air brake system while the gladhands are open.

SUMMARY

The present invention relates to drain valve for a vehicle compressed air system, wherein the drain valve separates dirt, water, debris and other relatively heavy objects from a compressed air stream. The drain valve includes a sump with a tangential inlet. The tangential inlet creates a vortex within the sump that collects relatively heavy objects at the bottom of the sump and allows the compressed air to exit the drain valve through an outlet port located at the top of the drain valve. A drain port allows for the collect material to be discharged from the drain valve.

DRAWING DESCRIPTIONS

In the accompanying drawings, which are incorporated in and constitute a part of this specification, embodiments of the invention are illustrated, which, together with a general description of the invention given above, and the detailed description given below serve to illustrate the principles of this invention.

DETAILED DESCRIPTION

Figure 1:
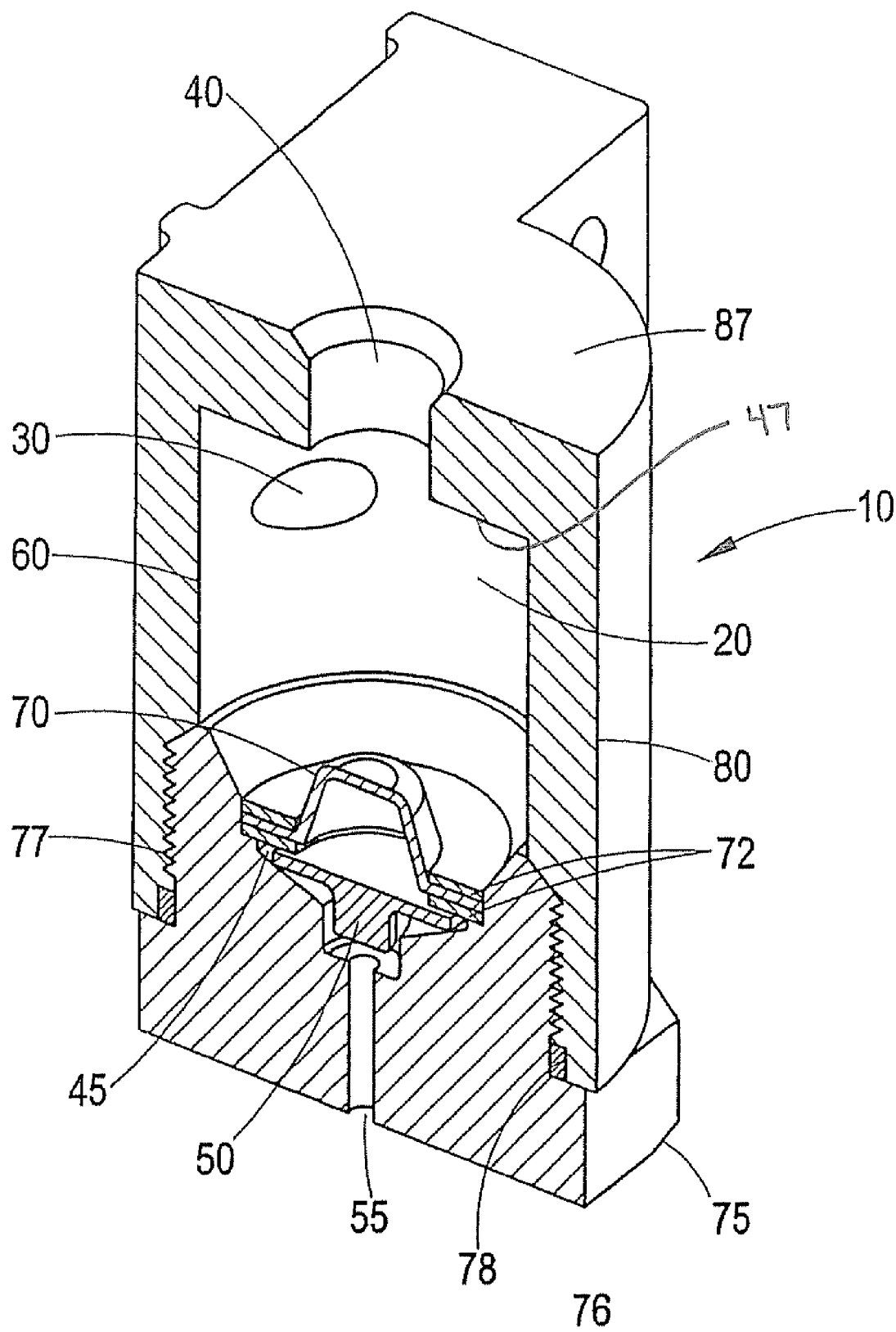
FIG. 1 is a longitudinal cross-sectional view of a drain valve of the present invention with the pressure actuated valve open.

The present invention is directed to a drain valve 10 which includes a sump 20. The drain valve 10 is located in a compressed air line 22 proximate to the gladhand connector 24 of the trailer, dolly or any other towed vehicle. Optionally, the drain valve 10 can be located on one or more of the tractor compressed air lines or any other location on a vehicle where water needs to be drained from a volume that occasionally depressurized. The sump 20 has a tangential inlet 30 causing cyclone action during brake application which enhances water and particulate separation capability. The air then exits the drain valve 10 through an outlet port 40 and is delivered to down stream brake components, such as, for example, a brake chamber, generally referenced as 25.

The drain valve 10 is inserted into the line between the control gladhand and the brake control valves. It is preferable to locate the drain valve 10 near the gladhand and at the first low point in the control line so that water naturally drains into the drain valve 10. During use of the control line, the air enters the drain valve 10 through the tangential inlet 30 and the cyclonic air effect separates the water and debris from the air. When no control line pressure exists, water and fine particles of debris and dust, drains from the outlet 45 of the sump 20 through a pressure actuated valve 50 and is thereby discharged from the system through drain port 55.

Figure 3:
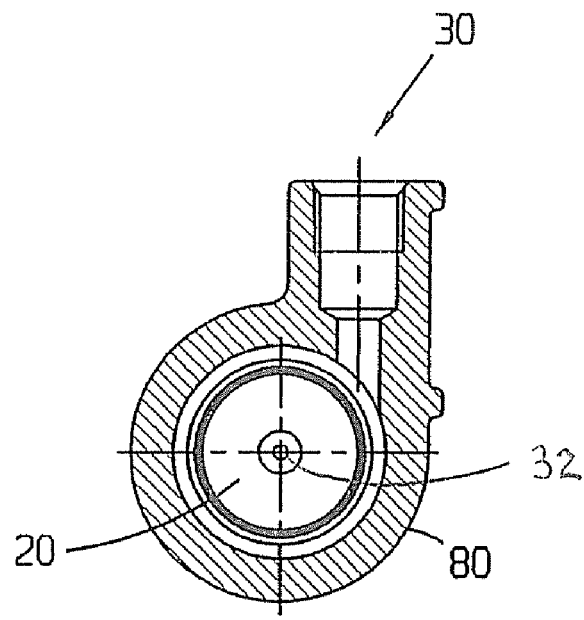
FIG. 3 is a horizontal cross-sectional view of a drain valve of the present invention.

During brake application, a pneumatic control signal of about 5 to about 40 pounds per square inch pressure is transmitted from the tractor. This pulse of air blows water and debris that may have entered the gland hand through the control line. Water and debris tangentially enter the generally cylindrical sump 20 and swirl around a central axis 32 (FIG. 3) forming a vortex. Water and debris are forced to the circumference of the sump 20 and clarified air flows to the center of the vortex and out the central outlet port 40 and into the brake valves. Upon release of the brakes, when control pressure drops to zero, or substantially close to zero, retained water is drained to atmosphere, or a collection apparatus (not shown), through the check valve 50 and through drain port 55. It is desirable to keep the sump volume low and the vortex action mild in order to minimize pressure drop through the drain valve 10 and thereby minimize any effect on brake application and release timing. In some embodiments the sump volume is approximately one cubic inch.

Figure 2:
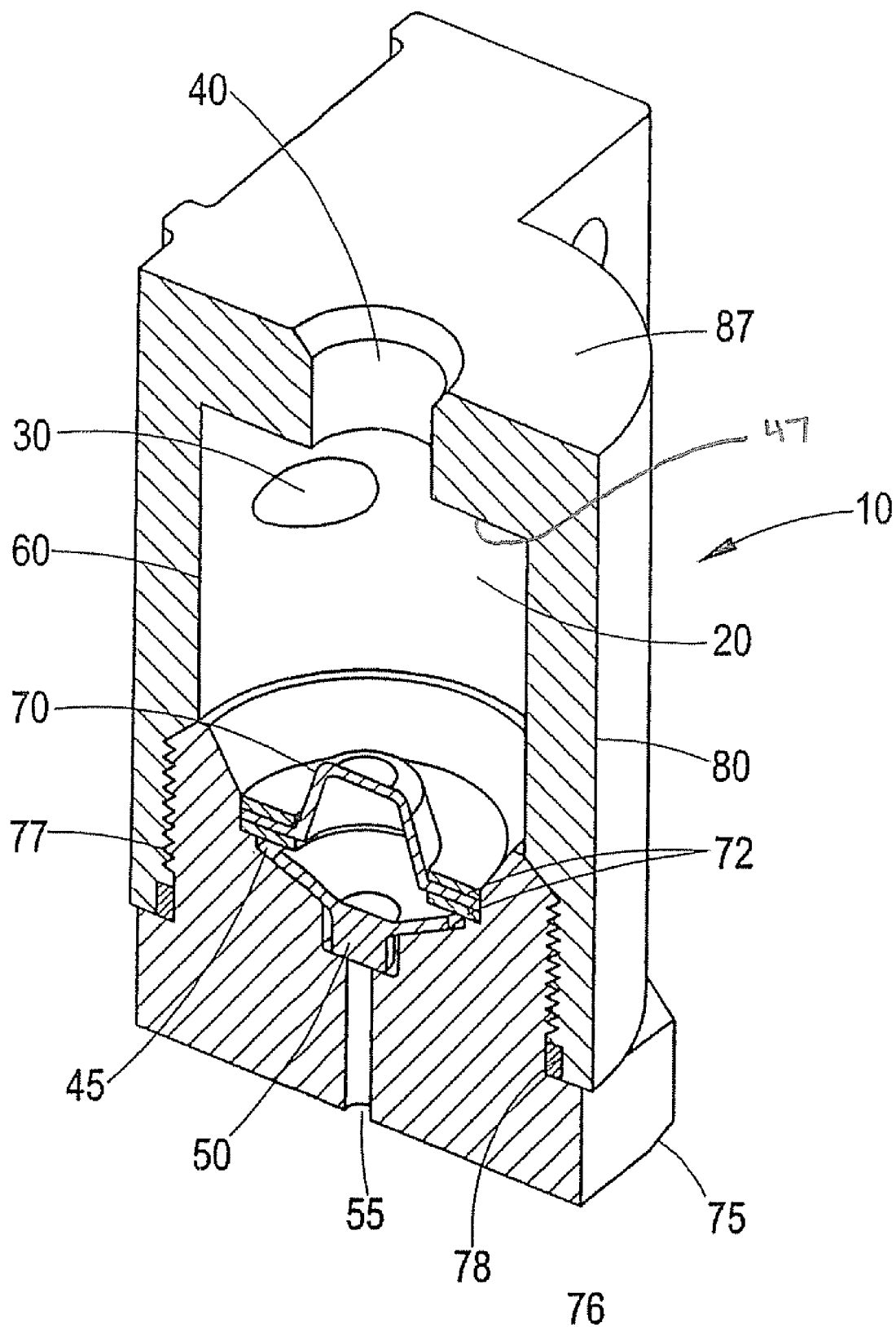
FIG. 2 is a longitudinal cross-sectional view of a drain valve of the present invention with the pressure actuated valve closed.

FIG. 1 illustrates an embodiment of the drain valve 10 wherein the inlet 30 is located on the side 60 of the generally cylindrical sump 20, such that the inlet air enters the sump tangentially. Air enters the sump 20 and swirls around the circumference of the sump. The heavier material, namely the water and the debris is forced outward towards the side 60 of the sump 20, while the lighter air is forced towards the center and upward towards the outlet port 40 formed in a top wall 47 of the valve 10. Once the pressure of the system drops, water and debris collected at the bottom 62 of the sump 20 is discharged through the drain port 55. A check valve 50 is used to close the drain port 55 when pressure is applied to the system and to open the drain port 55 to allow exhaust of the water and fine particles of debris when there is little to no pressure in the drain valve 10. In the illustrated embodiment in FIGS. 1 and 2, the check valve 50 is a flexible member that flexes between a first position and a second position in response to changes in pressure in the sump.

In the embodiment shown in FIG. 1, the drain valve 10 can also include a screen 70 that prevents larger debris from clogging the drain port 55. As shown in FIG. 1, the screen 70 can be positioned between two retaining plates 72 to maintain positioning of the screen. Further, in this embodiment, the drain port 55, the pressure actuated valve 50, and screen 70 are formed within a hex cap, or purge nut, 75, which includes a machined head 76, a set of threads 77 and an o-ring seal 78. The threads 77 of the hex cap 75 mate with a set of threads 79 on the drain valve body 80 thereby allowing the hex cap 75 to be easily removed for maintenance. In general, the hex cap or purge nut 75 may be similar to that disclosed in U.S. Pat. No. 5,762,094, which is fully incorporated herein by reference.

In other embodiments, a screen 71 is positioned between the sump 20 and the outlet 40, thereby preventing particles from reaching downstream components 25. It is preferred to use 100 mesh screen. As shown in the drawings, the screens 70 and 71 may be "hat-shaped" such that a portion of each of the screens protrudes into the vortex chamber. Use of screens having such a configuration may assist in stabilizing the vortex of air within the sump. This feature is discussed in U.S. Pat. No. 4,731,228, the entire disclosure of which is hereby incorporated by reference. It should be appreciated that other screen shapes and configurations are contemplated by this invention.

The some embodiments, the side 60 of the sump 20 and inlet port 30 are extruded aluminum. In other embodiments, they are die-cast plastic or aluminum. In other embodiments other suitable material is used.

Figure 4:
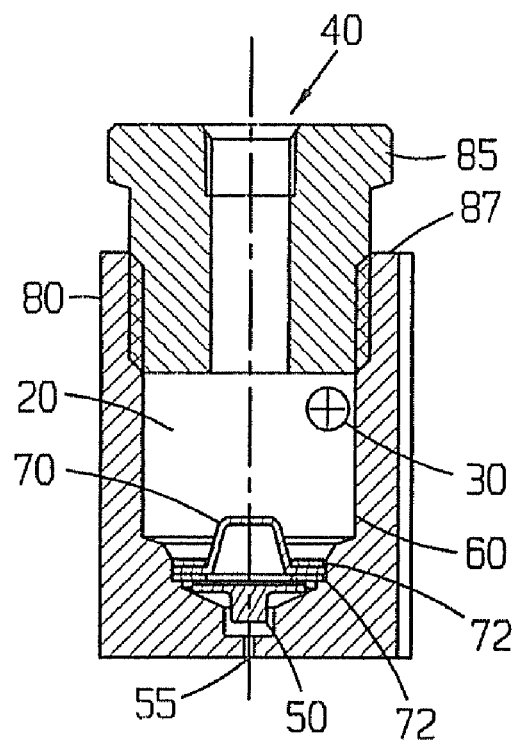
FIG. 4 is a longitudinal cross-sectional view of a drain valve of the present invention incorporating a fitting located at the opposite end as the drain port.
Figure 5:
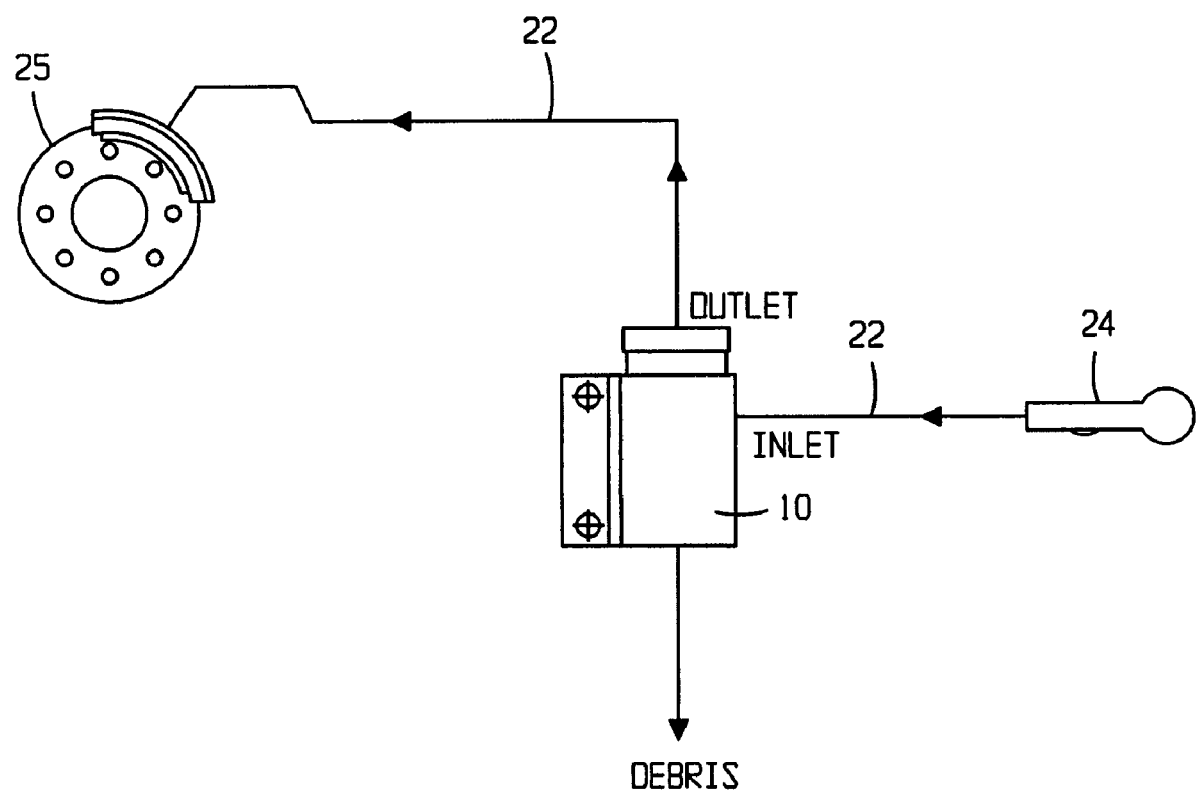
FIG. 5 is a schematic view of a compressed air system incorporating the drain valve of the present invention.

In some embodiments, the hex cap 77 is replaced by a cap with a different number of sides, a bushing, a National Pipe Thread (NPT) fitting, a spin-weld top, an ultrasonic-weld ninety degree top, a screw fastened ninety degree top or other connective fittings, generally referenced as 85. Such fittings can house the drain port 55 or can be located elsewhere on the drain valve 10. FIG. 4 is an illustrative example, wherein a pipe bushing 85 is threadably connected to the top portion 87 of the drain valve 10, and thus located at the opposite end as the drain port 55. In other embodiments, the cap can be attached in a non-serviceable manner, such as, for example, crimping or spin-welding. Furthermore, the connective fitting can be metal, such as, for example, brass or steel, or plastic such as, for example, glass-filled polypropylene.

Figure 6:
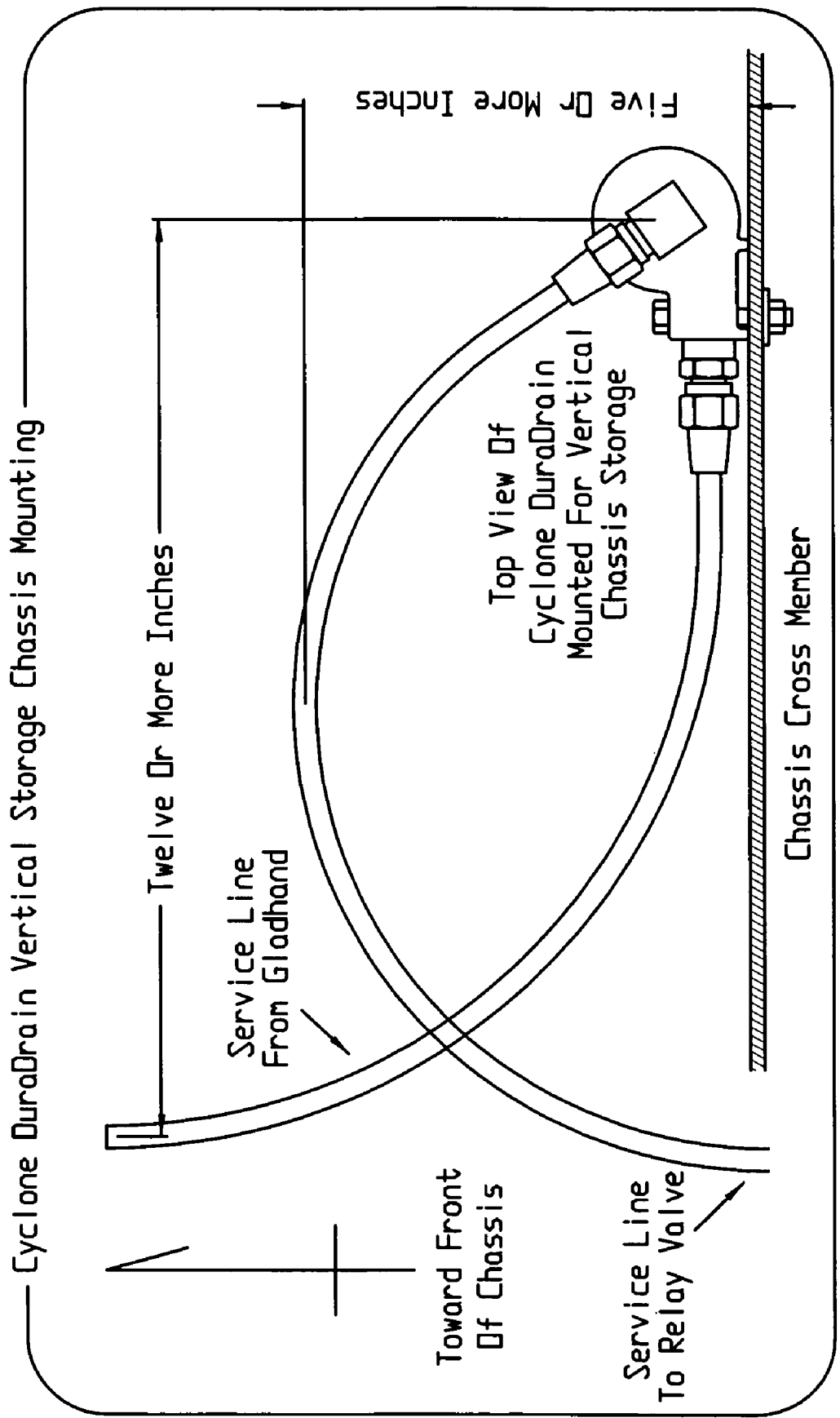
FIG. 6 illustrates a drain valve mounting configuration for vertical storage chassis mounting.

The drain valve 10 can generally be attached or mounted in any way or fashion, however certain mounting techniques can be used to provide increased benefits. For example, intermodal chassis that are stored vertically can use the drain valve 10 to protect the relay valve from water contamination by arranging the tubing to make a water trap during vertical storage. Water entering the glandhand will be trapped in the drain valve 10 by a loop of tubing. If the water level in the drain valve 10 rises above the centerline, it will begin to drain and the remainder will drain once the chassis is brought to horizontal. Such a configuration is shown in FIG. 6.

It should be appreciated that the drain valve 10 may have different configurations and different designs and that such designs are a part of the invention as they are provided for within the scope of the claims. For example, the present invention contemplates use of non-vortex valve bodies as well as bodies with impingement plates to reduce liquid carryover. Another example would be to replace the pressure actuated valve with a solenoid valve or other automatically controlled valve.

The invention claimed is:

1. A drain valve for a compressed air system comprising:
   a valve body;
   a sump centered along a central axis and disposed within said valve body;
   an air inlet and an air outlet, wherein said inlet is positioned such that an inlet stream of compressed air enters the sump tangentially and swirls around the central axis thereby creating a vortex that forces contaminants in the air stream toward the circumference of the sump to separate the contaminants from the inlet stream by weight, and wherein said outlet is positioned at a top portion of said drain valve and receives a lighter portion of the separated inlet stream for distribution to downstream components;
   a drain port located along the bottom of said sump;
   a pressure actuated valve, wherein when the sump experiences a first pressure, the pressure actuated valve opens the drain port to atmosphere and when the sump experiences a second pressure, the pressure actuated valve closes the drain port, wherein the first pressure is less than the second pressure; and
   a connective fitting, supporting the pressure actuated valve, including a male threaded portion that mates with a female threaded portion of the valve body and a flexible member that provides a seal between the connective fitting and the valve body.

2. The drain valve of claim 1, wherein said drain valve is positioned proximate to a gladhand connector.

3. The drain valve of claim 1, further comprising a screen located between the sump and the drain port.

4. The drain valve of claim 1, further comprising a screen located between the sump and the air outlet.

5. The drain valve of claim 1, wherein said sump has a volume equal to approximately one cubic inch.

6. A drain valve for a compressed air system comprising:
   a valve body;
   a sump centered along a central axis and disposed within said valve body;
   an air inlet port and an air outlet port, wherein the air inlet port is configured such that an inlet stream of compressed air exiting the port is directed along an inner sump wall and swirls around the central axis creating a cyclone action within the sump that forces contaminants in the air stream toward the circumference of the sump, and wherein said air outlet port is positioned at a top portion of said sump and receives a contaminant reduced portion of the inlet stream for distribution to downstream components;
   a drain port located along the bottom of said sump; and
   a pressure actuated sealing member adjacent the drain port, wherein when the sump experiences a first pressure, the pressure actuated sealing member opens the drain port to atmosphere and when the sump experiences a second pressure, the pressure actuated sealing member deforms to close the drain port, wherein the first pressure is less than the second pressure;
   wherein the base portion of the drain valve is formed by a connective fitting supporting the pressure actuated sealing member that defines the bottom surface of the sump, wherein the connective fitting includes a set of male threads that mates with a set of female threads located on said valve body, and wherein the drain port is integrally formed in the connective fitting.

7. The drain valve of claim 6, wherein said drain valve is positioned proximate to a gladhand connector.

8. A drain valve for a compressed air system comprising:
   a valve body having a top wall, a bottom wall, and a generally cylindrical side wall extending therefrom; the bottom wall formed by an end cap threadably attached to the cylindrical sidewall, said end cap having a concave conical surface, a drain opening, and a drain passage extending from the drain opening through the end cap to atmosphere, wherein the top wall, the generally cylindrical side wall and the concave conical surface define a sump centered along a central axis;

an air inlet port and an air outlet port, wherein the air inlet port is formed on the generally cylindrical sidewall of the sump and configured such that an inlet stream of compressed air exiting the port is directed into the sump along the generally cylindrical side wall and swirls around the central axis creating a cyclone action within the sump that forces contaminants in the air stream toward the generally cylindrical side wall, and wherein said air outlet port is positioned in the top wall and receives a contaminant reduced portion of the inlet stream for distribution to downstream components;

a flexible member supported by the end cap within the sump, wherein when the sump experiences a relatively low pressure, the flexible member is spaced away from the drain opening to open the sump to atmosphere and when the sump experiences a relatively high pressure, the air pressure acting on the flexible member flexes the flexible member into sealing engagement with the drain opening to close the drain passage;

wherein the end cap includes a set of male threads that mates with a set of female threads located on said cylindrical sidewall, and wherein the drain passage is integrally formed in the end cap.

\* \* \* \* \*